Feb. 26, 1957  H. REID  2,782,666
WORK-HOLDING CLAMP FOR WORKPIECES OF VARIABLE THICKNESS
Filed Sept. 8, 1954  4 Sheets-Sheet 1
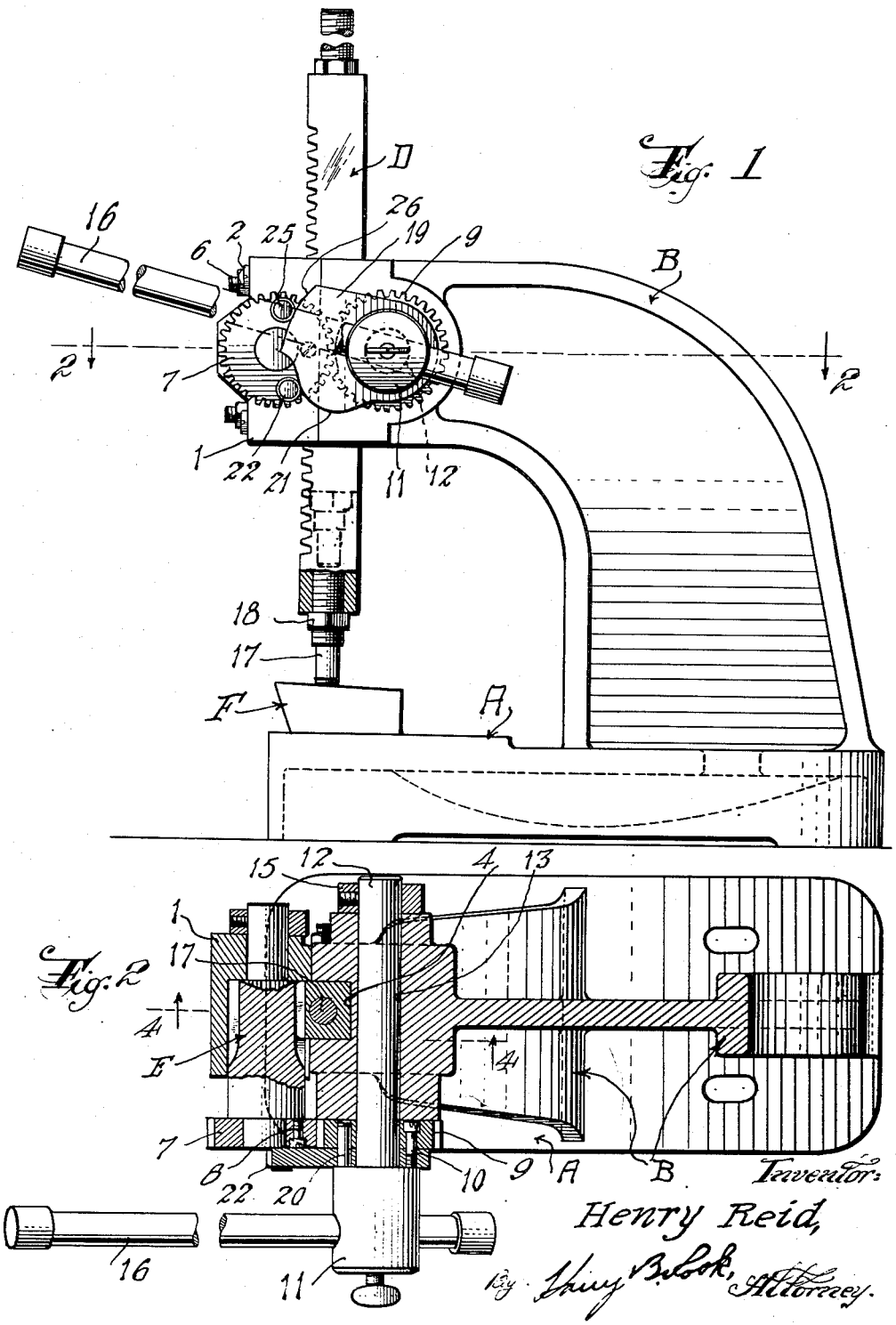
Inventor:
Henry Reid,

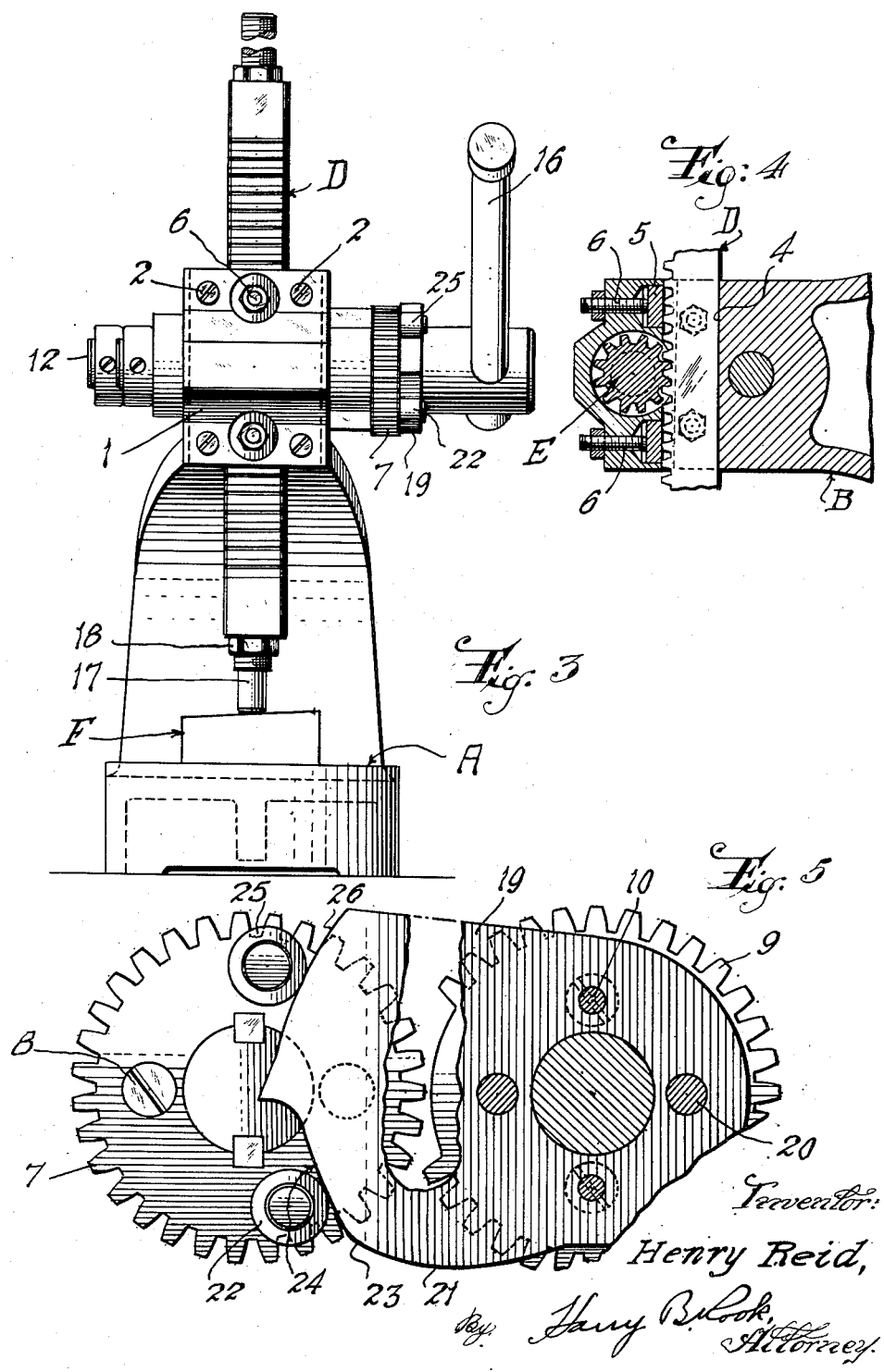

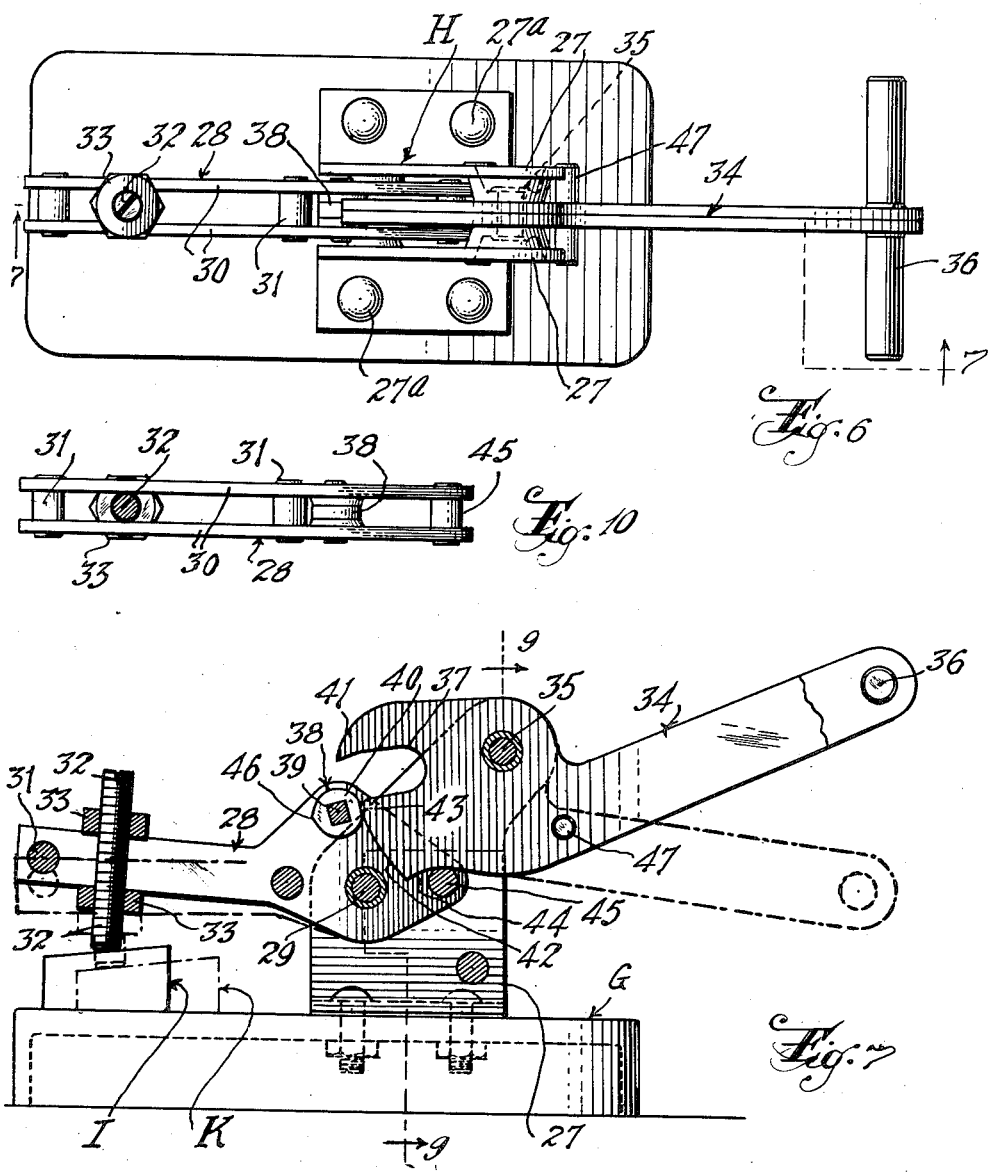

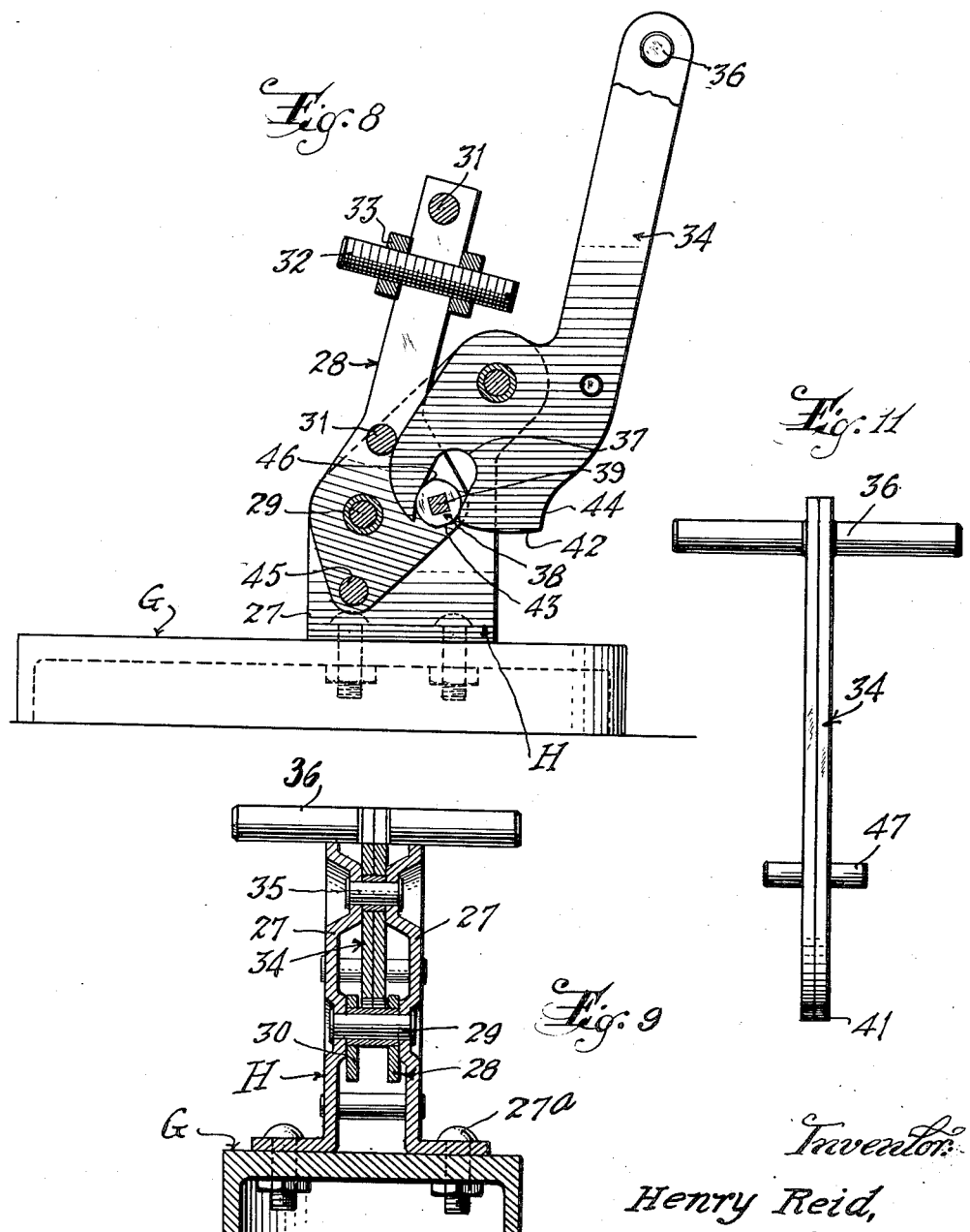

United States Patent Office 2,782,666
Patented Feb. 26, 1957

2,782,666

WORK-HOLDING CLAMP FOR WORKPIECES OF VARIABLE THICKNESS

Henry Reid, West Orange, N. J.

Application September 8, 1954, Serial No. 454,763

9 Claims. (Cl. 81—17)

This invention relates in general to a quick-acting clamp for holding workpieces of variable thickness in a desired position. Currently available clamps of this nature generally include toggle linkage to effect the locking of the clamp and workpiece with the workpiece in the desired position. In such devices movement of the clamp linkage is limited to a predetermined locking position; consequently, workpieces having variable thicknesses can not be securely held. This is not a desirable condition and can be overcome only by adjusting the clamp to the minimum workpiece thickness and compensating for the maximum workpiece thickness by "overclamping," that is, by straining or elastically deforming the clamp linkage by applying an excessive force to the clamp after contact of the work-engaging elements of the clamp with the work.

A prime object of the present invention is to provide a clamp that will be quick acting and at the same time will securely and uniformly hold a workpiece or workpieces of varying thicknesses without repeated adjustment of the clamp.

Another object is to provide such a clamp embodying a novel and improved construction whereby the work-engaging element will readily clear the workpiece to permit removal thereof and with no interference with the operator's hand during the work-releasing movement.

A further object is to provide a clamp of this character which shall include a novel and improved construction and combination of a work support, a work-engaging clamping element, means for quickly moving said clamping element into and out of clamping relation to a workpiece and cam means for easily and quickly locking and releasing the work-engaging element in and from work-clamping position.

Other objects, advantages and results of the invention will be brought out by the following description in conjunction with the accompanying drawings in which Figure 1 is a side elevation of a work-holding clamp constructed in accordance with the invention, showing the clamp and work-clamping condition;

Figure 2 is a horizontal sectional view approximately on the plane of the line 2—2 of Figure 1;

Figure 3 is a front elevation of the clamp;

Figure 4 is a fragmentary vertical longitudinal sectional view approximately on the plane of the line 4—4 of Figure 2;

Figure 5 is a greatly enlarged fragmentary side elevation, with portions broken away, of the actuating and locking mechanism for the work-engaging element;

Figure 6 is a top plan view of another type of work-holding clamp embodying the invention;

Figure 7 is a composite longitudinal vertical sectional view and side elevation approximately on the planes of the line 7—7 of Figure 6, showing the clamp in work-clamping condition;

Figure 8 is a view similar to Figure 7 showing the clamp in complete work-releasing condition;

Figure 9 is a transverse vertical sectional view through the whole clamp, approximately on the planes indicated by the line 9—9 of Figure 7;

Figure 10 is a detached top plan view of the work-clamping element with portions broken away and shown in section; and Figure 11 is a top plan view of the operating lever.

Specifically describing the embodiment of the invention illustrated in Figures 1-5 inclusive, the reference character A designates a work support or base A projecting upwardly and over which is a gooseneck standard B on which is mounted operating mechanism which includes a vertically reciprocable rack bar D with which meshes a pinion E that is journaled in a bearing block 1 which is separably connected to the end of the gooseneck standard B by cap screws 2. The rack bar is shown as slidable in a guide groove 4 in the gooseneck standard with its toothed side slidably engaged and guided by guide blocks 5 adjustably mounted in the bearing block 1 and held in adjusted positions by set screws 6.

The pinion E is rotated by a gear 7 which is fast-connected to the pinion as by screws 8 and meshes with a driving gear 9 which is fast-connected as by screws 10 to a head 11 at one end of a driving shaft 12 which is journaled in a horizontal bearing bore 13 in the gooseneck standard. The shaft is held against longitudinal movement in the standard B by the gear 9 and a stop collar 15. A handle 16 is provided for rotating the shaft.

The rack bar D has a work-engaging element in the form of a rod 17 adjustably screwed into the lower end of the rack bar and held in adjusted position by a lock nut 18. Several teeth, in the present instance five teeth, are removed from the driving gear 9 which normally has thirty-three teeth, the space formed by the missing teeth being related to the driven gear 7, which is shown as having thirty-one teeth, so that the teeth of the two gears will mesh to cause rapid movement of the work-engaging element 17 from normal work-clearing or releasing position indicated by broken lines in Figure 1 into clamping relation with a workpiece F on the support A as shown in Figure 1, whereupon the driven gear 7 will be disengaged from the teeth of the gear 9, as shown in Figures 1 and 5 and further movement of the driving shaft 12 in the same direction will actuate a cam mechanism to lock the work-engaging element in work-clamping position.

As shown, this cam mechanism includes a plate 19 fast-connected to the driving gear 9 by the screws 10 and pins 20. This plate has a cam surface including a portion 21 which engages a cam follower roller 22 on the driven gear 7 just prior to the movement of the teeth of the two gears out of mesh. During the first portion of the movement of the cam portion 21 in engagement with the roller 22, said cam portion actuates the driven gear 7 at a velocity identical to that provided by the gear teeth. As the gear teeth disengage, another portion 23 of the cam surface, to eliminate shock, deaccelerates the driven gear, after which the roller 22 is engaged by another cam surface portion 24, and another roller 25 on the driven gear is engaged by a separate cam surface portion 26 on the plate 19 for a purpose to be described. The self-locking portion 24 of the cam has a slight rise and continued rotation of the driving gear will cause the rack bar D to descend slowly and thereby cause the work-engaging element 17 to tightly clamp the workpiece F, and at the same time lock the driven gear 7 and consequently lock the work-engaging element in work-clamping position. It will be observed that a workpiece may be clamped at any position of the work-engaging element during the slow descent of said element under control of the self-locking portion 24 of the cam, so that the clamp can be used for securely holding a workpiece of variable thickness or workpieces of different thicknesses. Also, it will be noted that the work-engaging member is maintained under positive control at all times, throughout all movements thereof without lost motion between the parts of the operating mechanism and the work-engaging element. The construction also provides for an increased mechanical advantage near the end of the work-clamping movement.

The workpiece can be easily and quickly released by rotation of the driving shaft 12 and gear 9 in the opposite or clockwise direction in Figures 1 and 5. During the first portion of such movement the cam portion 26 actuates the roller 25 and consequently the driven gear 7 in a counterclockwise direction, while at the same time the cam portion 24 moves away from or releases the roller 22. Continued rotation of the cam plate 19 and the driving gear in the clockwise direction causes meshing of the teeth of the driving gear and driven gear so as to quickly elevate the work-engaging element 17 away from the workpiece.

In Figures 6-11 inclusive is illustrated a form of the invention wherein the actuating means for the work engaging element comprises a combination of levers instead of the pinion and rack combination shown in Figures 1-5 inclusive. As shown, the clamp includes a work support or base G on which is a standard or support H that comprises two spaced side plates 27 that are secured to the base by bolts 27a in spaced relation to each other. Between the plates 27, a work-clamping member in the form of a lever 28 is pivotally mounted intermediate its ends on a pivot pin 29. This lever is shown as comprising two spaced and parallel sections 30 that are rigidly connected by shouldered rivets 31; and between the sections 30 is a work-engaging element in the form of a screw 32 that is adjustable longitudinally of the lever and transversely of the lever toward and from the base, there being clamping nuts 33 on the screw 32 at opposite sides of the lever 28 for securing the work-engaging screw in adjusted positions.

Coacting with the work-clamping lever 28 is an operating lever 34 that is pivotally mounted intermediate its ends on a pivot pin 35 between the standard plates 27, one end of the lever having a handle grip 36 and the other end of the lever being disposed between the sections 30 of the work-clamping lever and having a notch 37 cooperative with a cam follower member 38 that comprises a polygonal cross pin 39 mounted in and extending between the sections 30 of the lever and having a hardened bearing ring 40 nicely fitted thereon and of a diameter to move into and out of said slot 37. The operating lever is pivoted on the standard above the pivotal connection 29 of the work-clamping lever with the standard, and the member 38 is connected to the work-clamping lever eccentrically to the pivot 29. The lever at one side of the slot 37 has an extension 41 to engage the member 38 and pull it into the slot 37 when the operating lever is swung in a counterclockwise direction (Figure 7) so as to swing the work-engaging element 32 away from the work support G as shown in Figure 8; and at the other side of the slot 37 the operating lever has a cam portion 42 to engage a flattened portion 43 on one side of the bearing ring 40 when the operating lever is swung from the normal work-releasing position of Figure 8 toward the work-clamping position of Figure 7 so as to swing the work-clamping lever toward the work support. This construction and arrangement of the parts permits a "quick-acting" movement of the work-clamping lever 28 to and from work-clamping position by engagement of the walls of the slot 37 with the member 38, and when the member 38 is moved out of the slot at the work-clamping position, further movement of the operating lever in the same clockwise direction in Figure 7 will cause the self-locking cam portion 42 on the operating lever to engage the flattened portion 43 on the member 38 and thereby force the work-engaging element 32 into clamping engagement with the work. The final clamping action can take place on any portion of the self-locking cam portion 42 so that the workpiece thickness can vary depending on the rise of the cam portion 42. In other words, the clamp may firmly hold a workpiece I as shown by solid lines in Figure 7 and may equally effectively and firmly hold a workpiece K of different thickness as shown by broken lines in Figure 7. In all cases, the clamp will be firmly locked in work-clamping position.

To ensure that the member 38 will enter the slot 37 of the operating lever during the movement of the clamp to normal work-releasing position, a supplementary cam portion 44 is provided on the operating lever to coact with a cross pin 45 on the work-clamping lever so that as the operating lever is swung in counterclockwise direction in Figure 7 and as the cam portion 42 is disengaged from the member 38, the cam portion 44 will engage the pin 45 and initiate swinging of the work-clamping arm upwardly toward work-releasing position.

Preferably, a protuberance 46 is provided on the bearing ring 40 to compensate for the flattened portion 43 so as to ensure continuous nice sliding engagement of the walls of the slot with the bearing ring and thereby eliminate lost motion and chattering of the member 38 in the slot 37.

Preferably, a stop pin 47 is provided on the operating lever to engage the standard H and limit work-clamping movement of the operating lever and work-clamping lever.

The cam portions 24, 26 and 42 have the nature of inclined planes of small rise of a few degrees, for example 3° to 4°, it being understood that a cam is in effect a revolving inclined plane.

It will be observed that in both forms of the invention the components of the rapid-drive means (7 and 9 or 34, 37, 41) and of the cam means (19—26 or 38—45) are movable around a single pair of parallel axes to ensure smooth, continuous movement of the work-engaging member in both directions throughout the operation of the rapid-drive means and the cam means.

While I have shown and described the now preferred embodiments of the invention, it will be understood by those skilled in the art that the invention may be utilized in connection with other types of clamps and that the structural details of the invention may be modified, all within the scope of the invention. To avoid circumlocution, the term "work support" is used in the appended claims to include all devices or surfaces against which a workpiece or the like is to be clamped or held.

What I claim is:

1. A work-holding clamp comprising a work-engaging member, means mounting said work-engaging member to travel toward and away from a work support into work-clamping and work-clearing positions respectively, an operating mechanism including an operating member and rapid-drive means movable around a single pair of parallel axes to drive said work-engaging member rapidly from said work-clearing position to a point near said work-clamping position and from said point back to said work-clearing position during movement of said operating member in opposite directions respectively, said rapid-drive means having a continuous driving connection with said work-engaging member throughout said movements and being disconnected when said work-engaging member reaches said point, and cam means also movable around said axes and drivingly connected to said work-engaging member at said point simultaneously with disengagement of said rapid-drive means during movement of said work-engaging member from said work-clearing position to drive said work-engaging member into work-clamping position and said cam means being continuously drivingly connected to said work-engaging member to move the latter from said work-clamping position back to said point and being disconnected from said work-engaging member at said point at the same time that said rapid-drive means is connected to said work-engaging member to drive the latter from said point to said work-clearing position.

2. A work-holding clamp as defined in claim 1 wherein said cam means includes co-acting parts to releasably lock said work-engaging member in work-clamping position, said co-acting parts comprising a cam surface portion of small rise and a follower therefor.

3. A work-holding clamp as defined in claim 1 wherein said cam means includes cooperating parts to drive said work-engaging member from said point into work-clamping position, and said cam means has other cooperating parts to drive said work-clamping member from said work-clamping position to said point and to cause connection of said rapid-drive means with said work-engaging member at said point.

4. A work-holding clamp as defined in claim 1 wherein the rapid-drive means includes a pair of gears one of which is connected to said work-clamping member to actuate the latter, while the other is a driving gear, the second-mentioned gear having a series of teeth to mesh with the teeth of the first-mentioned gear to move said work-clamping member to said point and then to move out of mesh with the teeth of the first-mentioned gear, and said cam means includes a pair of studs fast-connected to one end of the first mentioned gear and cam surface portions connected to the second-mentioned gear beyond one end of said series of teeth to engage said studs after disengagement of said teeth and thereby move said work-engaging member to engage and clamp a workpiece on said work support.

5. A work-holding clamp as defined in claim 1 wherein said work-clamping member is a rack bar on said mounting means, said rapid-drive means includes a shaft rotatable in said mounting means, a mutilated driving gear on said shaft having a smooth space formed by the removal of at least one tooth, a pinion journaled in said standard and meshing with said rack bar and a driven gear drivingly connected to said pinion and meshing with said driving gear, and said cam means includes a cam plate having a cam surface and fast-connected to said shaft, a follower fast-connected to said driven gear, said cam surface being engageable with said follower as the teeth of the driving gear move out of mesh with the teeth of the driven gear through said space.

6. A work-holding clamp as defined in claim 5 wherein said cam surface has a portion thereof of small rise engageable with said follower upon continued movement of said shaft in said direction to lock said work-engaging member in said work-clamping position.

7. A work-holding clamp as defined in claim 6 wherein said cam surface has another portion thereof and another follower roller therefor fast-connected to said driven gear for actuating the driven gear into mesh with the driving gear upon rotation of the latter in the direction opposite to that of the first-mentioned movement of said driving gear, so as to move said work-engaging member out of work-clamping position.

8. A work-holding clamp as defined in claim 1 wherein said work-engaging member is a lever pivoted intermediate its ends on said mounting means, said operating member and rapid drive means comprises a lever pivoted intermediate its ends on said mounting means and having a slot in one end thereof and a follower on said work-engaging member movable out of and into said slot to cause movement of said work-engaging member toward and away from said work support upon swinging of said operating lever in opposite directions respectively, and said cam means includes a cam surface on said operating lever engageable with said follower upon disengagement of said follower from said slot.

9. A work-holding clamp as defined in claim 8 with the addition of a cam surface on said operating lever and a follower therefor on said work-clamping member to actuate the latter and cause engagement of the first-mentioned follower with said slot upon movement of said operating lever in the direction to actuate said work-clamping member into work-clearing position.

References Cited in the file of this patent

UNITED STATES PATENTS

| | | |
|---|---|---|
| 834,402 | Peick | Oct. 30, 1906 |
| 1,805,443 | Walters | May 12, 1931 |
| 2,236,439 | McKenna | Mar. 25, 1941 |
| 2,350,034 | Herrington | May 30, 1944 |
| 2,685,898 | Gifford | Aug. 10, 1954 |